US008883337B2

United States Patent
Kim et al.

(10) Patent No.: US 8,883,337 B2
(45) Date of Patent: Nov. 11, 2014

(54) SUPPORT FOOT FOR BATTERY PACK, BATTERY PACK WITH THE SAME AND METHOD OF MANUFACTURING THE SAME

(75) Inventors: Il-Joong Kim, Suwon-si (KR); Jang-Gun Ahn, Suwon-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 1651 days.

(21) Appl. No.: 12/076,214

(22) Filed: Mar. 14, 2008

(65) Prior Publication Data

US 2008/0226978 A1 Sep. 18, 2008

(30) Foreign Application Priority Data

Mar. 16, 2007 (KR) .................. 10-2007-0026205

(51) Int. Cl.
| | | |
|---|---|---|
| *H01M 2/10* | (2006.01) | |
| *H01M 2/00* | (2006.01) | |
| *B29C 65/00* | (2006.01) | |
| *B29C 65/60* | (2006.01) | |
| *B29C 45/16* | (2006.01) | |
| *B29C 65/02* | (2006.01) | |
| *B29K 21/00* | (2006.01) | |
| *B29L 31/00* | (2006.01) | |

(52) U.S. Cl.
CPC ............. *H01M 2/10* (2013.01); *B29K 2021/00* (2013.01); *B29C 66/532* (2013.01); *B29C 66/126* (2013.01); *B29C 66/472* (2013.01); *B29C 66/1142* (2013.01); *B29C 65/606* (2013.01); *B29L 2031/7146* (2013.01); *B29C 66/47* (2013.01); *B29C 45/1676* (2013.01); *Y02E 60/12* (2013.01); *B29C 65/02* (2013.01)
USPC .............. 429/100; 429/163; 429/96; 429/186

(58) Field of Classification Search
CPC B29K 2021/00; B29C 66/126; B29C 66/472; B29C 65/606; B29C 66/47; H01M 2/10
USPC ..................................... 429/100, 163, 96, 186
See application file for complete search history.

(56) References Cited

U.S. PATENT DOCUMENTS

| 5,001,603 A | * | 3/1991 | Villaneuva et al. ........... 361/730 |
| 2001/0046258 A1 | * | 11/2001 | Wise et al. ..................... 375/219 |
| 2006/0246350 A1 | * | 11/2006 | Takayama et al. ............. 429/178 |

FOREIGN PATENT DOCUMENTS

| JP | 09-331160 | | 12/1997 | |
| JP | 2001-069210 | * | 3/2001 | .............. H04M 1/02 |

(Continued)

OTHER PUBLICATIONS

Korean Notice of Allowance issued by Korean Patent Office on Apr. 12, 2010 corresponding Korean Patent Application No. 10-2007-0026205 and Request for Entry of the Accompanying Office Action attached herewith.

(Continued)

*Primary Examiner* — Helen O Conley
(74) *Attorney, Agent, or Firm* — Robert E. Bushnell, Esq.

(57) ABSTRACT

A support foot for a battery pack, a battery pack including the support foot and a method for manufacturing the battery pack are provided. The support foot is constructed with a first support part, and a second support part including a protrusion. The protrusion is inserted into the battery pack and is thermally welded to be attached to the battery pack, so that the support foot can be securely attached to the battery pack.

5 Claims, 10 Drawing Sheets

(56) References Cited

FOREIGN PATENT DOCUMENTS

| KR | 20-1990-0021565 | 12/1990 |
| KR | 2019990000352 | 1/1999 |

OTHER PUBLICATIONS

Office Action from the Korean Patent Office issued in Applicant's corresponding Korean Patent Application No. 2007-0026205 dated Jun. 30, 2008.

* cited by examiner

SUPPORT FOOT FOR BATTERY PACK, BATTERY PACK WITH THE SAME AND METHOD OF MANUFACTURING THE SAME

CLAIM OF PRIORITY

This application makes reference to, incorporates the same herein, and claims all benefits accruing under 35 U.S.C. §119 from an application earlier filed in the Korean Intellectual Property Office on 16 Mar. 2007 and there duly assigned Serial No. 10-2007-0026205.

BACKGROUND OF THE INVENTION

1. Field of the Invention

The present invention relates to a support foot for a battery pack, a battery pack with the support foot and a method for manufacturing the battery pack; and more particularly, to a support foot for a battery pack, a battery pack with the support foot and a method for manufacturing the battery to enable the support foot to be strongly attached to the battery pack.

2. Description of the Related Art

In general, as compact and lightweight portable wireless devices such as video cameras, cellular phones and notebooks are actively being developed, a lot of research on secondary batteries used as a driving power source has progressed. Such secondary batteries include a nickel-cadmium (Ni—Cd) battery, a nickel-hydrogen (Ni-MH) battery and a lithium (Li) battery. Among these batteries, the Li secondary battery is widely used in high-tech electronic devices because the Li secondary battery is rechargeable, can be formed either in a small size or in a large size, and has high operating voltage and high energy density per unit weight.

The Li battery is constructed with a bare cell, which has an electrode assembly including a positive electrode plate, a negative electrode plate and a separator, a can containing the electrode assembly and a cap assembly sealing a top opening of the can, and safety devices such as a positive temperature coefficient (PTC) element, a thermal fuse and a protection circuit module. Then, a battery pack is formed by being put into a separate external case, or filling a gap with hot-melt resin and then tubing and labeling the resulting a thin external material.

Generally, the battery packs are mass-produced in a hard pack type in which the battery pack is built in a hard case, for example, a current battery for a cellular phone, and in an inner pack type (generally called in the art) used to be directly put on a terminal of an electronic or electrical device by a user. Here, the inner pack type needs a separate external case covering the battery pack to protect the battery pack.

Here, as described above, on one side of a hard case of an hard pack type or an external case of an inner pack type, a support foot (generally known as a rubber foot in the art) is set, thereby protecting the battery pack from external impact, or preventing slipping of a terminal in which the battery pack is disposed.

A contemporary battery pack having a support foot is typically constructed with a bare cell, and a case containing the bare cell. A support foot accommodating part in which the support foot is placed is formed at one side of the case.

Also, the support foot is typically constructed with a support part and a double-sided tape. Here, the support part is made from rubber materials to protect the battery pack from external impact, and prevent slipping of a terminal in which the battery pack is disposed.

In the contemporary battery pack including the contemporary support foot, one side of the double-sided tape is adhered to a top surface of the support part, and the other side of the double-sided tape is adhered to the support foot accommodating part, and thus the support foot is adhered to the support foot accommodating part.

In the contemporary battery pack including the contemporary support foot, however, the support foot is adhered to the support foot accommodating part by only the double-sided tape, so that the support foot may be detached from the accommodating part because the adhesion of the double-sided tape is decreased with the passage of time or with a strong external force applied to the support foot.

SUMMARY OF THE INVENTION

It is therefore an object of the present invention to provide an improved support foot for a battery pack, an improved battery pack including the support foot, and an improved method for manufacturing the battery pack.

It is another object of the present invention to provide a support foot for a battery pack to securely attach the support foot to the battery pack, a battery pack including the support foot and a method for manufacturing the battery pack including the support foot.

According to an aspect of the present invention, a support foot for a battery pack is provided. The support foot may be constructed with a first support part, and a second support part disposed over the first support part and including a protrusion.

According to another aspect of the present invention, a battery pack is provided. The battery pack may be constructed with a bare cell, a case connected with the bare cell, and a support foot connected with the case. The support foot may be constructed with a first support part and a second support part having a protrusion.

Also, the first support part may be made from rubber materials. And the second support part may be made from plastic materials.

According to still another aspect of the present invention, a method for manufacturing a battery pack is provided. In accordance with the method, a case is first provided with a through hole. Then, a support foot is provided with a first support part and a second support part having a protrusion. Afterwards, the protrusion is inserted into the through hole. Finally, the protrusion is thermally welded.

Also, the case may further include a groove formed along the periphery of the through hole, and the through hole may be thermally welded in the groove.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

The detailed matters about the objects, technical features and effects of the present invention will be more fully understood by the following detailed description with respect to the drawings illustrating exemplary embodiments of the present invention. In the drawings, the thickness of layers and regions may be exaggerated for clarity. Like elements are denoted by like reference numerals throughout the drawings.

Figure 1A:
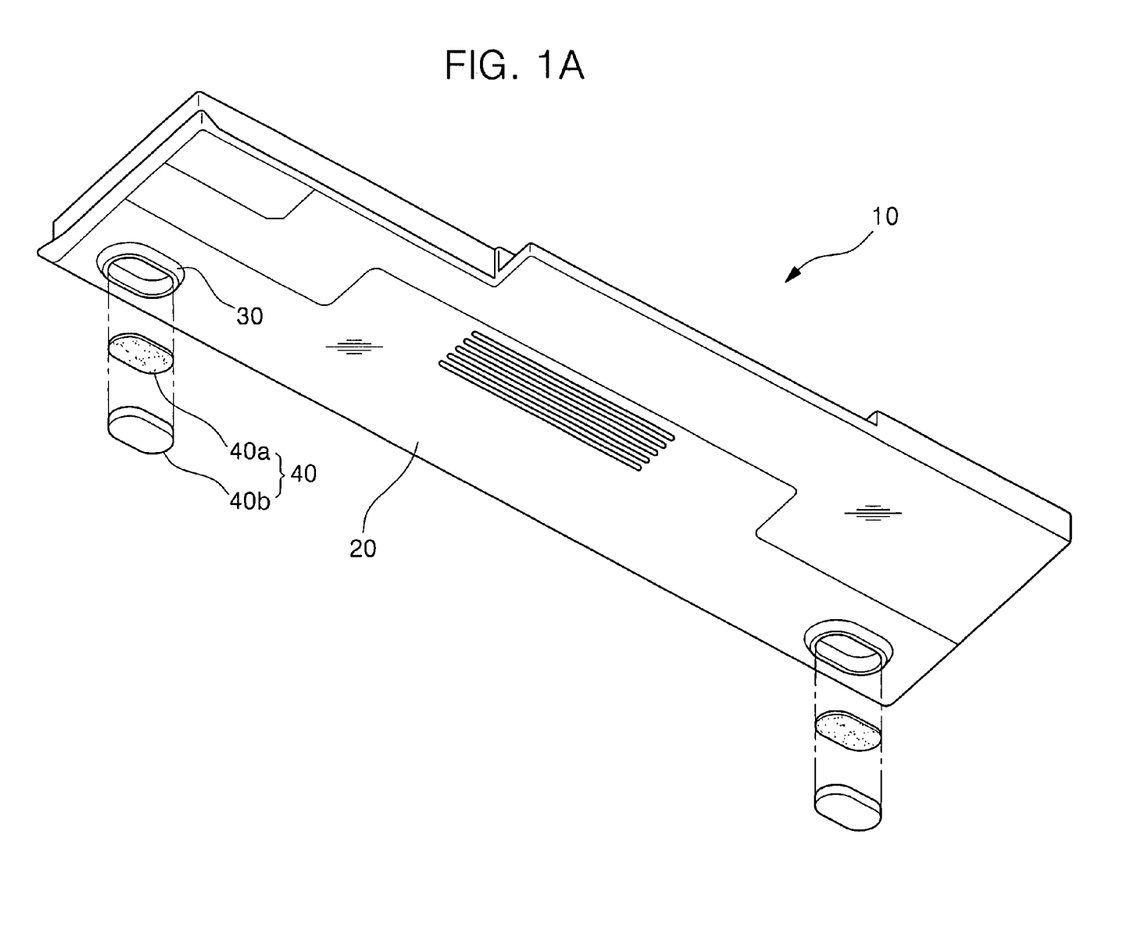
FIG. 1A is an exploded oblique view of a battery pack including a contemporary support foot.
Figure 1B:
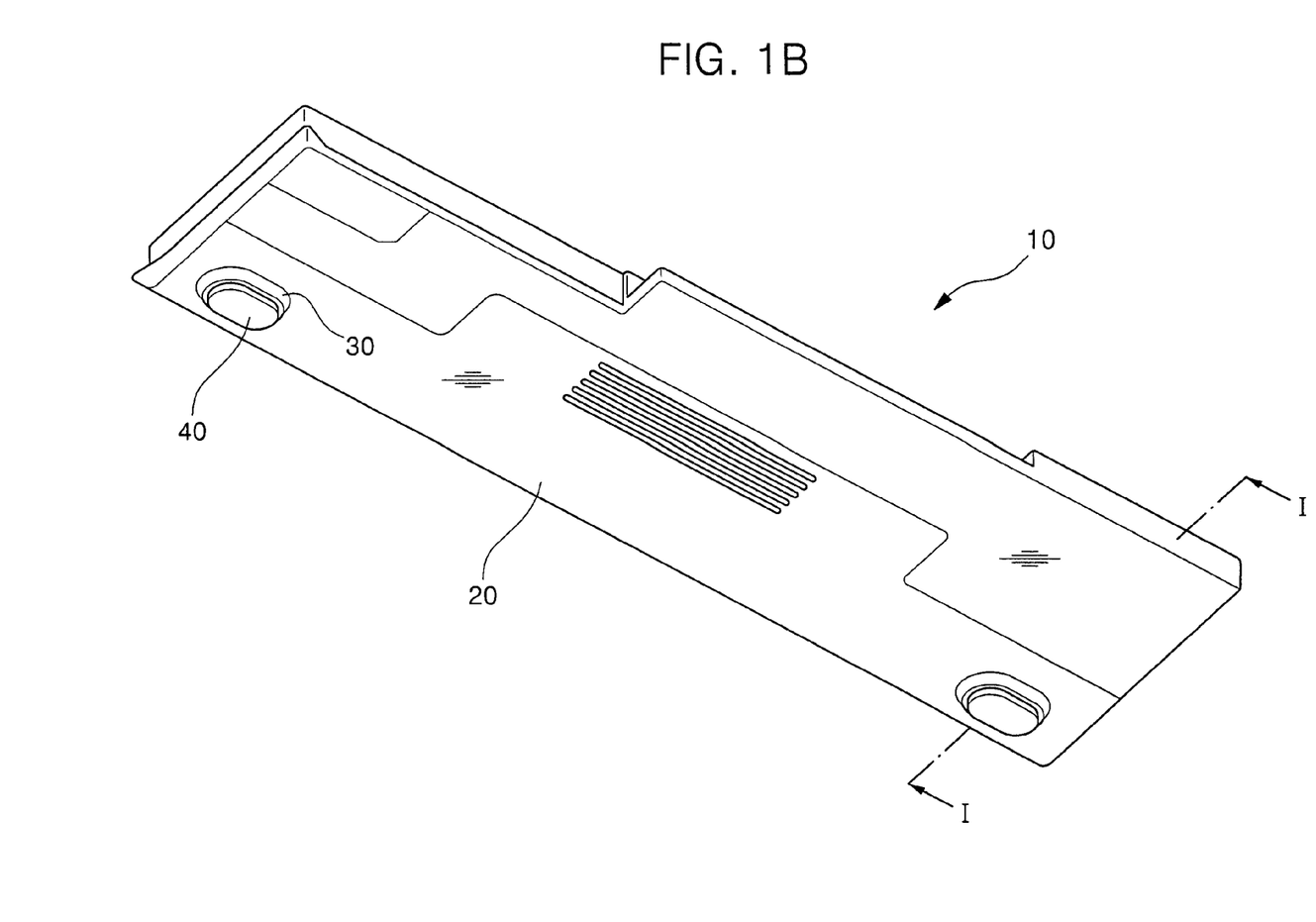
FIG. 1B is an assembled oblique view of the battery pack including the contemporary support foot.
Figure 1C:
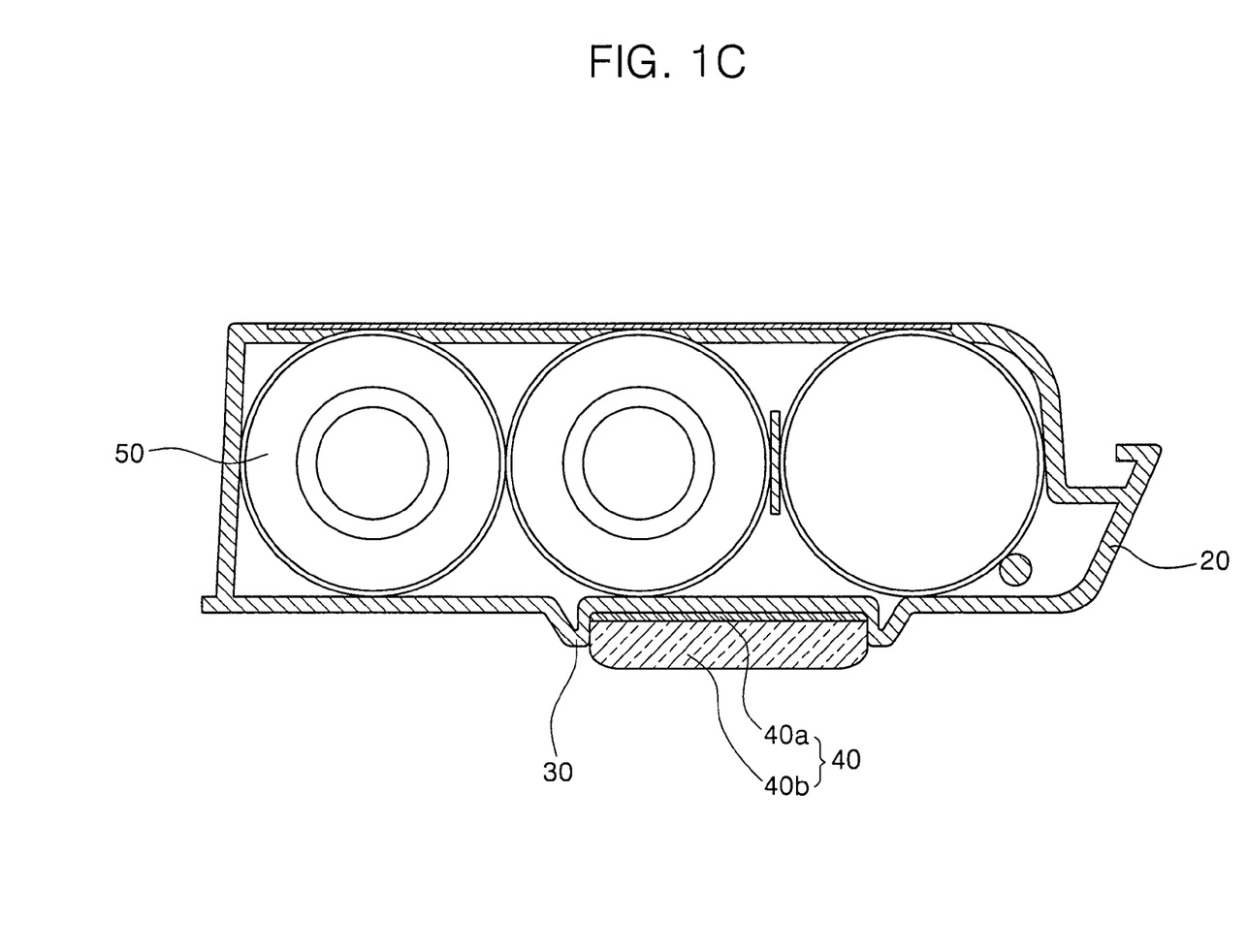
FIG. 1C is a cross-sectional view taken along line I-I of FIG. 1B.

FIG. 1A is an exploded oblique view of a battery pack having a contemporary support foot, FIG. 1B is an assembled oblique view of a battery pack having a contemporary support foot, and FIG. 1C is a cross-sectional view taken along line I-I of FIG. 1B.

Referring to FIGS. 1A through 1C, a battery pack 10 having a contemporary support foot is constructed with a bare cell 50 and a case 20 containing bare cell 5. A support foot accommodating part 30 in which support foot 40 is placed, is formed at one side of case 20.

Also, support foot 40 includes a support part 40b and a double-sided tape 40a. Here, support part 40b is made from rubber materials to protect battery pack 100 from external impact, and prevent slipping of a terminal in which the battery pack is placed.

In the battery pack including the contemporary support foot, one side of double-sided tape 40a is adhered to a top surface of support part 40b, and the other side of double-sided tape 40a is adhered to support foot accommodating part 30, and thus support foot 40 is adhered to support foot accommodating part 30.

In the battery pack including the contemporary support foot, however, support foot 40 is attached to support foot accommodating part 30 by only double-sided tape 40a. Therefore, support foot 40 may be detached from support foot accommodating part 30 because the adhesion of double-sided tape 40a decreases with the passage of time or when strong external force is applied to support foot 40.

Figure 2A:
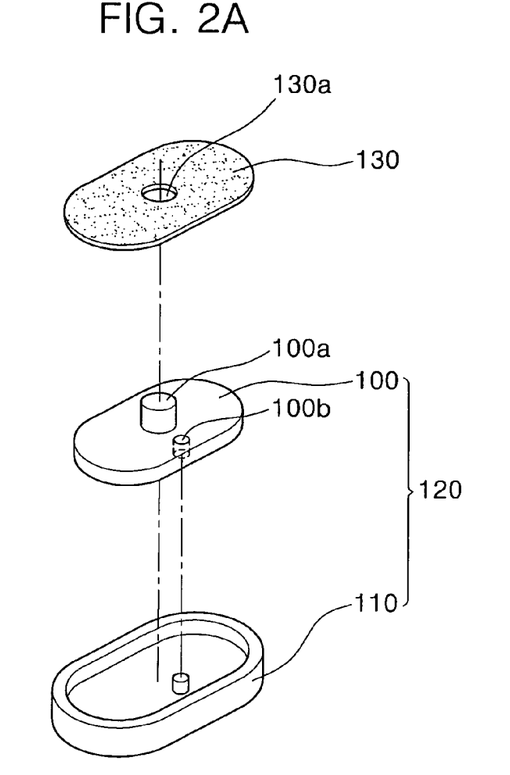
FIG. 2A is an exploded oblique view of a support foot constructed as an exemplary embodiment according to the principles of the present invention.
Figure 2B:
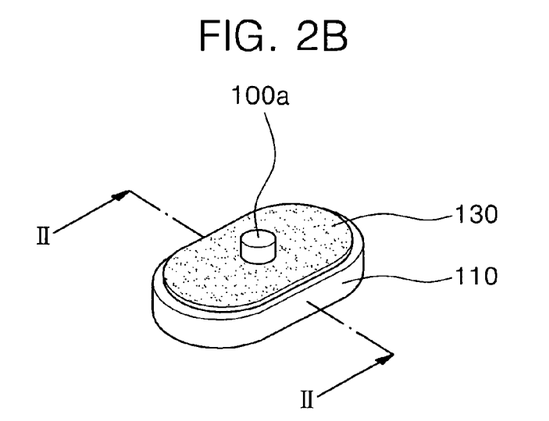
FIG. 2B is an assembled oblique view of the support foot according to the exemplary embodiment of the present invention.

FIG. 2A is an exploded oblique view of a support foot constructed as an exemplary embodiment according to the principles of the present invention; FIG. 2B is an assembled oblique view of the support foot according to the exemplary embodiment of the present invention; and FIG. 2C is a cross-sectional view taken along line II-II of FIG. 2B.

Figure 2C:
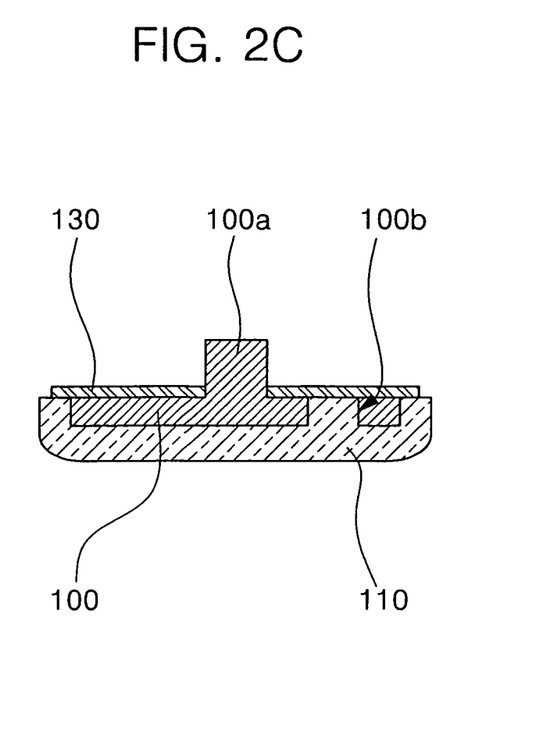
FIG. 2C is a cross-sectional view taken along line II-II of FIG. 2B.

Referring to FIGS. 2A to 2C, a support foot 120 according to an exemplary embodiment of the present invention is made from a first support part 110 and a second support part 100. Second support part 100 is disposed over first support part 110. Also, a double-sided tape 130 may be disposed over second support part 100. Here, first support part 110 is made from rubber materials to protect the battery pack from external impact, and to prevent slipping of a terminal in which the battery pack is placed. And second support part 100 is made from plastic materials to be thermally welded.

Also, second support part 100 includes a protrusion 100a, and may include a punch hole 100b. Here, protrusion 100a is inserted into a through hole in a case (not shown) to be described later, and is thermally welded to attach support foot 120 to the case. Punch hole 100b is to improve an integration between first support part 110 and second support part 100 in a double-injection molding process to be described later. One protrusion 100a and one punch hole 110b are illustrated in the drawings, but more than one protrusion and punch hole may be formed. The more protrusions, the stronger the resulting adhesion may be between the case and the support foot; and the more punch holes, the higher the resulting integration may be between the first support part and the second support part. Also, protrusion 100a may be formed in a cylinder, square pillar, or triangular pillar shape, and punch hole 100b may be formed in the form of a circle, square or triangle, but the shapes of the protrusion and punch hole are not limited thereto.

Double-sided tape 130 includes a through hole 130a. As illustrated in FIG. 2B, protrusion 100a of second support part 100 is inserted through through hole 130a, and thus double-sided tape 130 adheres to a top surface of second support part 100. Here, one surface of double-sided tape 130 is adhered to the top surface of second support part 100, and the other surface of double-sided tape 130 is adhered to a support foot accommodating part to be described later to attach support foot 120 to the support foot accommodating part. In the present invention, however, because the protrusion of the second support part is inserted into the through hole of the case and is thermally welded to attach the case and the support foot together, the support foot may be formed without the double-sided tape.

Also, support foot 120 may be formed by molding first support part 110 and second supporting part 100 using a double-injection process. That is, support foot 120 may be formed by double-injecting an injection liquid to form first support part 110 made from rubber materials, during the formation of second support part 100 including protrusion 100a and punch hole 100b by injection molding, to thereby integrate second support part 100 and first support part 110.

Here, through punch hole 100b formed in second support part 100, an injection liquid for forming first support part 110 is injected, thereby more closely integrating first support part 110 and second support part 100. That is, as illustrated in FIG. 2C, first support part 110 is formed in punch hole 100b of second support part 100, thereby more closely integrating first support part 110 and second support part 100.

Figure 3A:
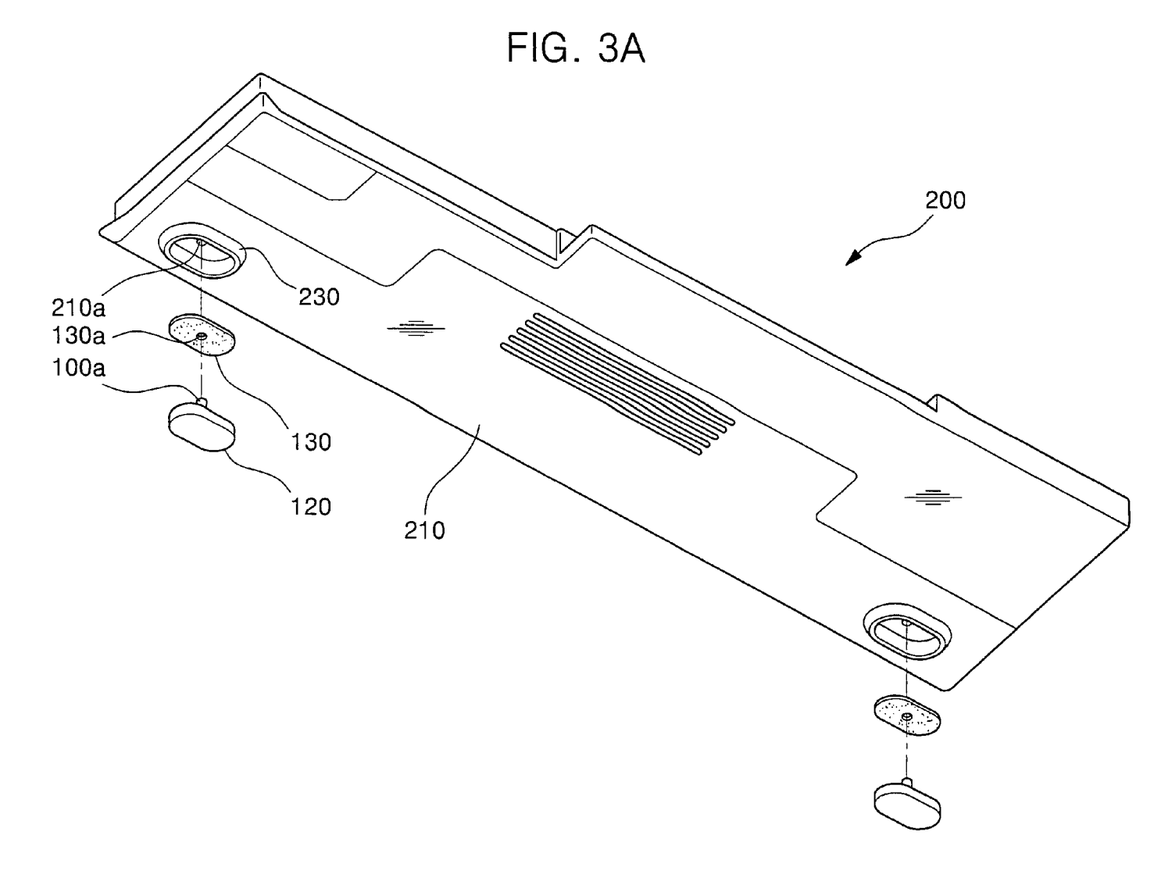
FIG. 3A is an exploded oblique view of a battery pack including a support foot constructed as an exemplary embodiment according to the principles of the present invention.
Figure 3B:
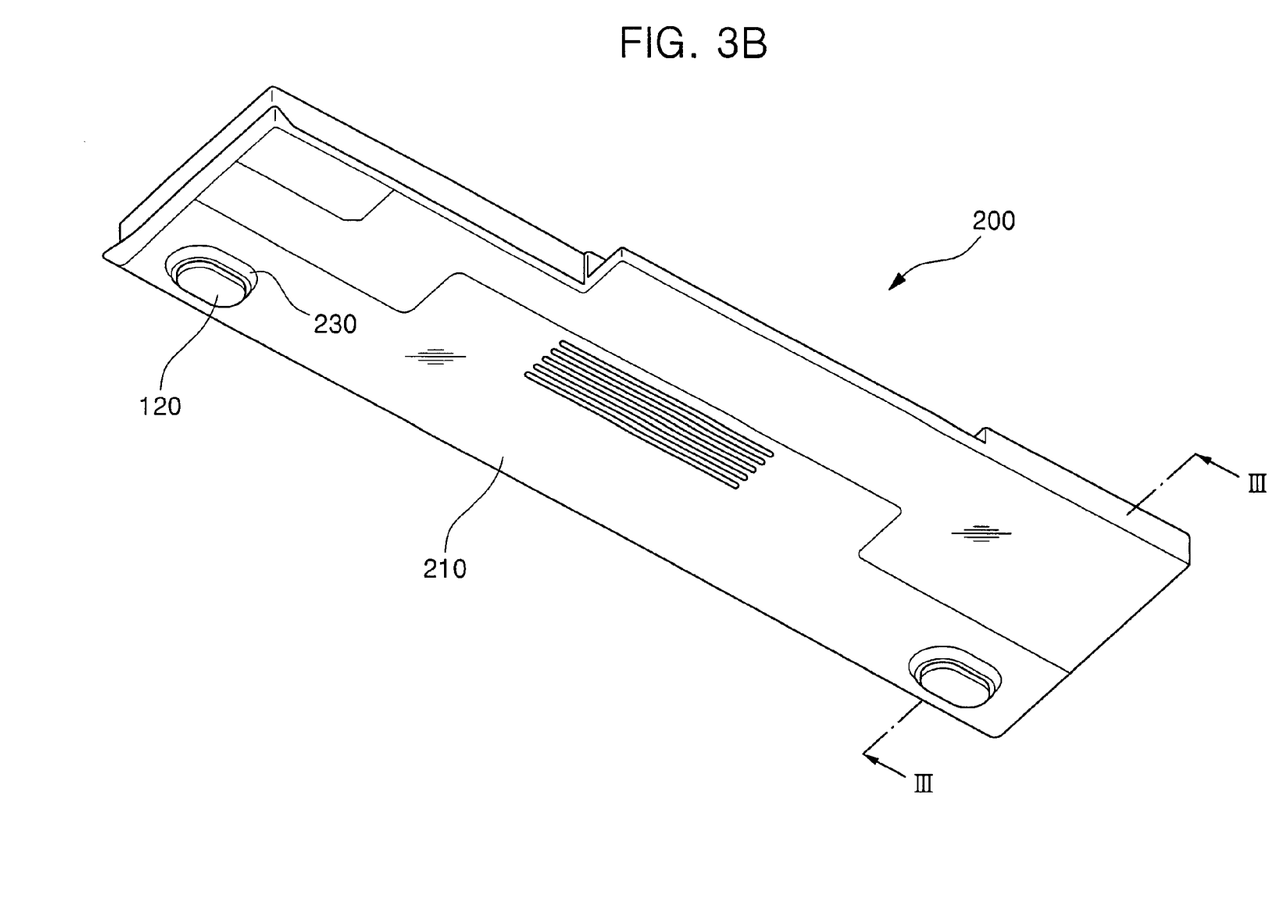
FIG. 3B is an assembled oblique view of the battery pack including the support foot according to the exemplary embodiment of the present invention.
Figure 3C:
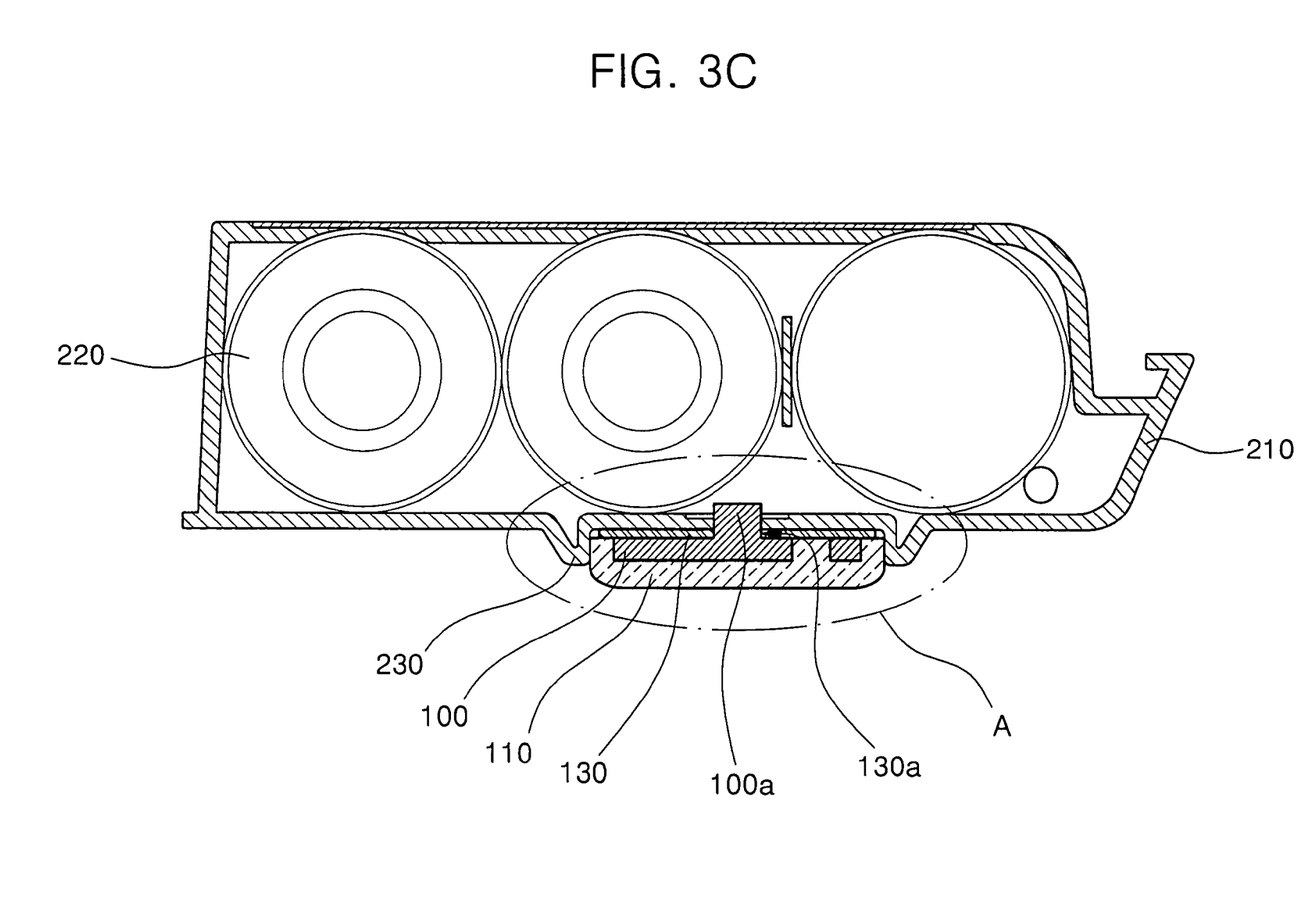
FIG. 3C is a cross-sectional view taken along line III-III of FIG. 3B.
Figure 3D:
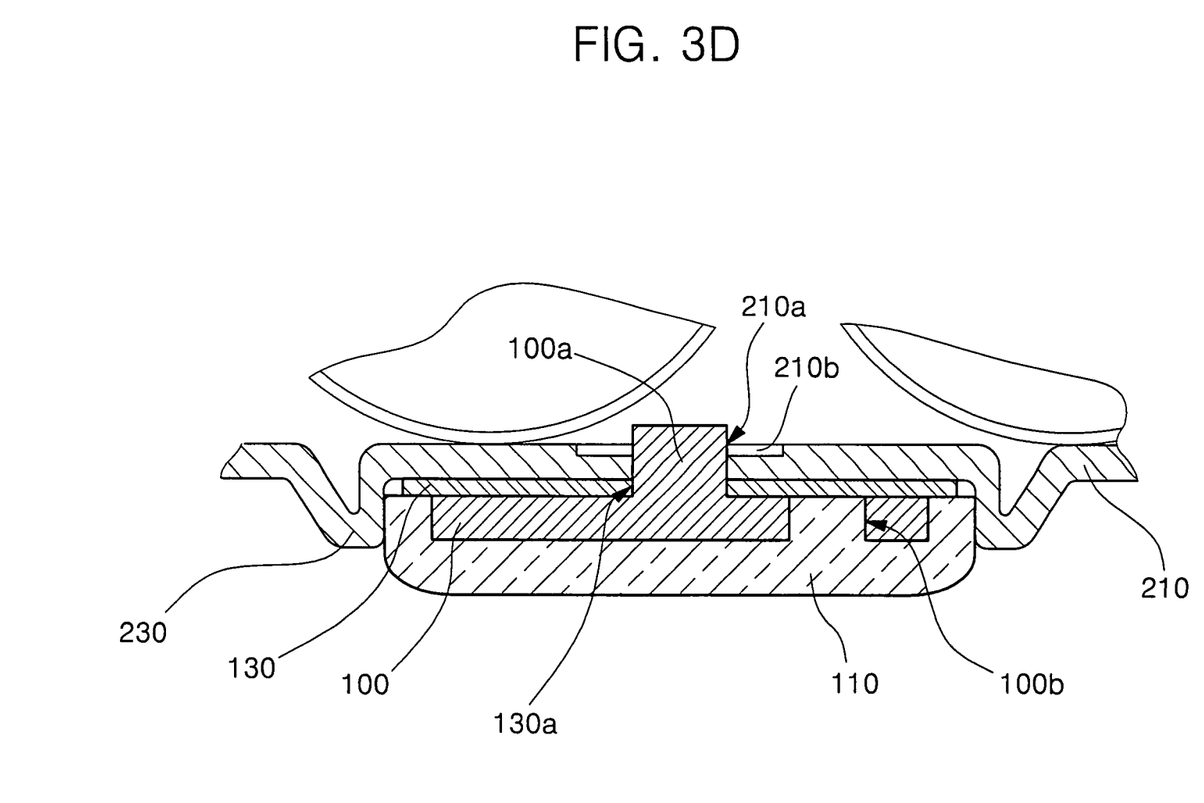
FIG. 3D is an enlarged cross-sectional view of region A in FIG. 3C before thermal-lamination of a protrusion.
Figure 3E:
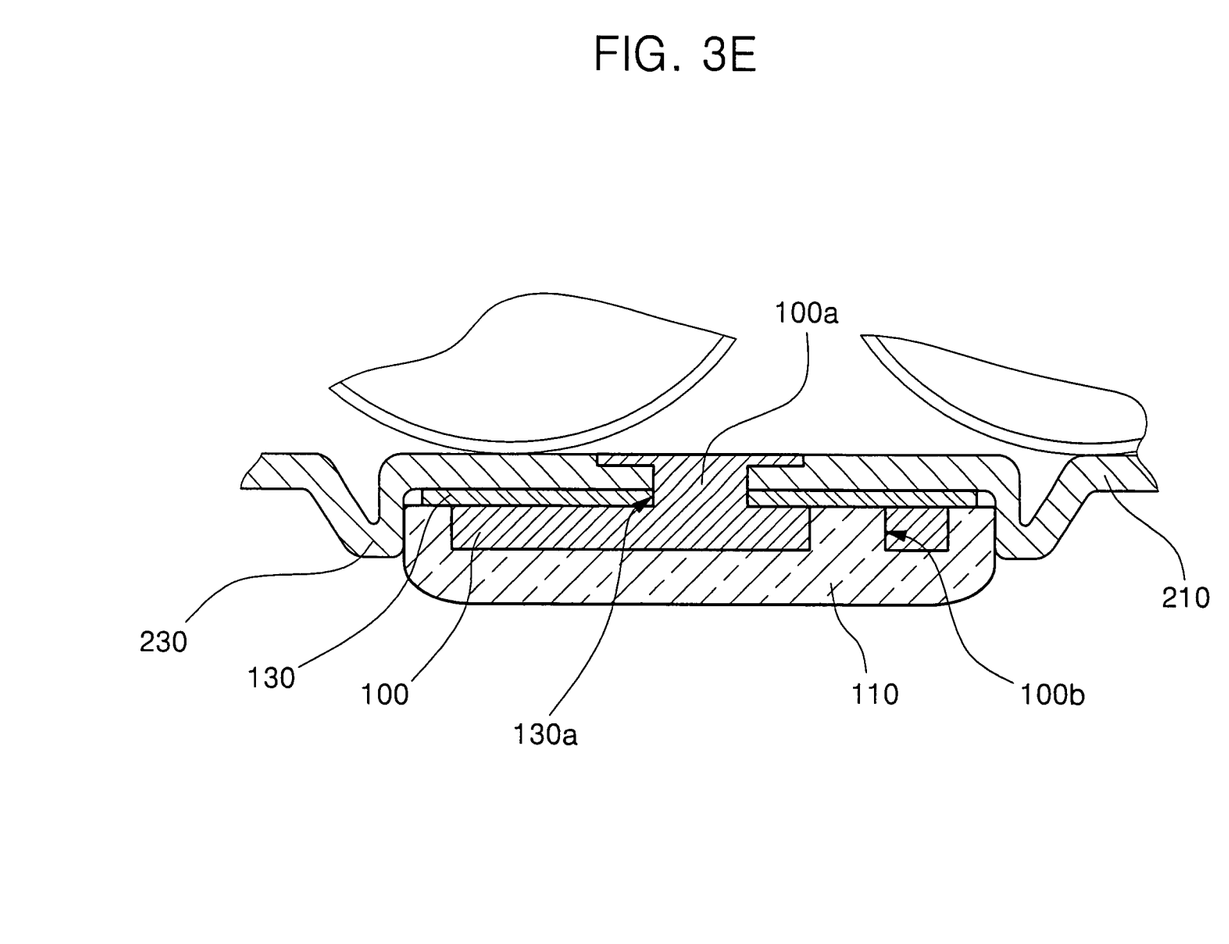
FIG. 3E is an enlarged cross-sectional view of region A in FIG. 3C after thermal-lamination of the protrusion.

FIG. 3A is an exploded oblique view of a battery pack including a support foot according to an exemplary embodiment of the principles of the present invention; FIG. 3B is an assembled oblique view of the battery pack including the support foot according to the exemplary embodiment of the present invention; FIG. 3C is a cross-sectional view taken along line III-III of FIG. 3B; FIG. 3D is an enlarged cross-sectional view of region A of FIG. 3C before thermal-lamination of a protrusion; and FIG. 3E is an enlarged cross-sectional view of the protrusion after the thermal-lamination.

First, referring to FIGS. 3A to 3D, a battery pack 200 including a support foot according to the present invention is constructed with a bare cell 220, a case 210 connected with bare cell 220, and a support foot accommodating part 230 connected with a support foot 120 at one side of case 210. Here, support foot 120 may be connected to one side of case 210 without the separate support foot accommodating part 230.

Bare cell 220 is a secondary battery such as a Li ion battery, a Ni-MH battery or a Ni—Cd battery, which is not limited to the type of the battery.

The Li ion battery is classified into a battery using an aqueous electrolyte and a battery using a solid polymer or gel electrolyte according to the kind of an electrolyte. Also, the Li ion battery may be classified as either a can-shaped battery or a pouch-shaped battery according to the shape of a accommodating part into which an electrode assembly is put.

In the can-shaped Li ion battery, the electrode assembly is put into the can made from, for example, aluminum containing metal by deep drawing. Commonly, the can-shaped Li Ion battery uses an aqueous electrolyte.

Also, the can-shaped secondary battery may be classified into a square-shaped battery and a cylindrical battery. The square-shaped battery has a container (case) formed in a rectangular parallelepiped shape or thinly formed by rounding a sidewall edge of a rectangular parallelepiped. The cylindrical battery is usually used in a relatively large-capacity electronic/electrical device, and forms a battery pack by connecting multiple batteries together.

Meanwhile, referring to FIG. 3D, case 210 is constructed with support foot accommodating part 230 in which support foot 120 is placed, and a through hole 210a is formed in support foot accommodating part 230. Also, along the periphery of through hole 210a, a groove 210b having a certain length is formed. Here, through hole 210a may be formed in the form of a circle, square or triangle, and groove 210b may have the same shape as the through hole. The present invention does not, however, limit the shapes of the through hole and the groove.

Although the drawing illustrates case 210 in a hard pack type in which a battery pack is built in a hard case, case 210 may be a separate external case covering the battery pack for an inner pack type, which is directly inserted into the electronic device.

Also, support foot 120 is made from first support part 110, and second support part 100 which is disposed over first support part 110. Also, double-sided tape 130 may be disposed over second support part 100. Here, first support part 110 is made from rubber materials to protect a battery pack from external impact and to prevent a slipping of a terminal in which battery pack 200 is disposed, and second support part 100 is made from plastic materials which can be thermally welded.

Second support part 100 is constructed with protrusion 100a, and may include punch hole 100b. Here, protrusion 100a is inserted into through hole 210a in support foot accommodating part 230 and is thermally welded to attach case 210 and support foot 120 together. Punch hole 100b improves integration between second support part 100 and first support part 110 in a double-injection molding process. In the drawing, one protrusion 100a and one punch hole 100b are illustrated, but at least one protrusion and punch hole may be formed.

In the battery pack including the support foot according to the exemplary embodiment of the present invention as illustrated in FIG. 3E, protrusion 100a of second support part 100 is inserted into case 210, and is thermally welded by heat and pressure to attach case 210 and support foot 120 together, so that support foot 120 can be strongly adhered to battery pack 200, compared to the contemporary battery pack that tapes the support foot to the case by using only a double-sided tape.

Here, the more protrusions 100a, the stronger adhesion may be resulted between case 210 and support foot 120; and the more punch holes 10b, the higher integration may be resulted between first and second support parts 110 and 100.

Also, protrusion 100a may be formed in a cylinder, square pillar or triangular pillar shape, and punch hole 100b may be formed in the form of a circle, square or triangle. But the present invention does not limit the shapes of the protrusion and punch hole.

Meanwhile, double-sided tape 130 includes through hole 130a, and protrusion 100a of the second support part is inserted into through hole 130a, and thus double-sided tape 130 is adhered to the top surface of second support part 100. Here, one surface of double-sided tape 130 is adhered to the top surface of second support part 100, and the other surface of double-sided tape 130 is adhered to support foot accommodating part 230 to strongly adhere support foot 120 to support foot accommodating part 230. In the present invention, however, because protrusion 100a of second support part 100 is inserted into through hole 210a of support foot accommodating part 230 and is thermally welded to thereby attach case 210 to support foot 120, support foot 120 may be formed without the double-sided tape.

A method of manufacturing a battery pack according to an exemplary embodiment of the principles of the present invention will now be described.

First, referring to FIG. 3D, case 210 including through hole 210a, and support foot 120 including first support part 110 and second support part 100 having protrusion 100a, which are formed by double-injection molding, are provided. And protrusion 100a of second support part 100 is inserted into through hole 210a of case 210. Here, during the manufacturing of second support part 100 including protrusion 100a and punch hole 100b by injection molding, a liquid for forming first support part 110 made from rubber materials is double-injected, and thus second support part 100 is adhered to first support part 110. Also, a liquid for forming first support part 110 is injected into punch hole 110b formed in second support part 100 to thereby more closely integrate first support part 110 with second support part 100.

Subsequently, a certain part of the inserted protrusion 100a is thermally welded using heat and pressure to attach support foot 120 to case 210. In this case, protrusion 100a of second support part 100 is inserted into case 210, and is thermally welded by heat and pressure to attach case 210 to support foot 120. Thus, support foot 120 is adhered to battery pack 200 in the present invention stronger than in the contemporary battery pack in which the support foot and the case are adhered by only a double-sided tape. Also, since the height of the protrusion which is projected is low, it is possible to prevent interference with other elements in the case.

Here, as illustrated in FIG. 3E, groove 210b is formed along the periphery of through hole 210a, and thus protrusion 100a can be thermally welded in groove 210b, which can strengthen the adhesion between the support foot and the case.

According to the present invention, using a support foot for a secondary battery including a first support part and a second support part having a protrusion, the protrusion can be inserted into a battery pack and then thermally welded to attach a support foot to the battery pack stronger than in a contemporary battery pack.

Also, according to the present invention, by the structure as described above, the battery pack can be protected from an external impact, and slipping of a terminal having the battery pack can be prevented.

Although the present invention has been described with reference to certain exemplary embodiments thereof, it will be understood by those skilled in the art that a variety of modifications and variations may be made to the present invention without departing from the spirit or scope of the present invention defined in the appended claims, and their equivalents.

What is claimed is:

1. A battery pack, comprising:
   a bare cell;
   a case containing the bare cell, the case comprising a through hole; and
   a support foot connected to the case, the support foot comprising a first support part being made from rubber material, and a second support part being made from plastic material,
   the second support part disposed between the case and the first support part,
   wherein the first support part includes a first protrusion protruding toward the case, and
   wherein the second support part includes a second protrusion inserted into the through hole, and a punch hole coupled to the first protrusion.

2. The battery pack according to claim 1, further comprising a double-sided tape disposed between the case and the second support part.

3. The battery pack according to claim 1, wherein the second protrusion is formed in a shape selected from a group of cylinder, square pillar or triangular pillar shape.

4. The battery pack according to claim 1, wherein the case further comprising a support foot accommodating part is in contact with the second support part, and the through hole of the case is disposed in the support foot accommodating part of the case.

5. The battery pack according to claim 1, wherein the bare cell is one of a lithium ion battery, a nickel-hydrogen battery and a nickel-cadmium battery.

* * * * *